(12) United States Patent
Shimizu et al.

(10) Patent No.: US 11,572,104 B2
(45) Date of Patent: Feb. 7, 2023

(54) VEHICLE BODY

(71) Applicants: TOYOTA JIDOSHA KABUSHIKI KAISHA, Toyota (JP); SUBARU CORPORATION, Tokyo (JP)

(72) Inventors: Kazuki Shimizu, Kariya (JP); Tomoyuki Itoh, Nagoya (JP); Shoichi Saito, Nagakute (JP); Satoshi Ikeda, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/461,269

(22) Filed: Aug. 30, 2021

(65) Prior Publication Data

US 2022/0073141 A1    Mar. 10, 2022

(30) Foreign Application Priority Data

Sep. 4, 2020    (JP) .............................. JP2020-149248

(51) Int. Cl.
  *B62D 25/04*    (2006.01)
  *B62D 21/15*    (2006.01)
  *B62D 25/14*    (2006.01)
  *B62D 27/02*    (2006.01)

(52) U.S. Cl.
  CPC ........... *B62D 25/04* (2013.01); *B62D 21/152* (2013.01); *B62D 25/145* (2013.01); *B62D 27/023* (2013.01)

(58) Field of Classification Search
  CPC ...... B62D 25/04; B62D 25/14; B62D 25/145; B62D 27/023; B62D 21/15; B62D 21/152
  USPC ............ 296/193.01, 203.01, 203.02, 187.09, 296/187.1, 193.06
  See application file for complete search history.

(56) References Cited

U.S. PATENT DOCUMENTS

2016/0016612 A1    1/2016    Torikawa et al.

FOREIGN PATENT DOCUMENTS

| DE | 102010022151 B4 * | 2/2015 | ............. B62D 25/02 |
| JP | 3951507 B2 * | 8/2007 | ............. B62D 25/02 |
| JP | 2015-136999 A | 7/2015 | |
| JP | 2016-22813 A | 2/2016 | |
| JP | 5924331 B2 * | 5/2016 | ........... B62D 25/145 |

\* cited by examiner

*Primary Examiner* — Dennis H Pedder
(74) *Attorney, Agent, or Firm* — Oliff PLC

(57) ABSTRACT

A vehicle body may include a front pillar including a pillar front plate, a pillar rear plate, a pillar inner plate and a pillar outer plate, wherein the pillar front plate, the pillar rear plate, the pillar inner plate and the pillar outer plate form a tube; and a pillar reinforcement arranged in the front pillar. The pillar reinforcement may be arranged rearward of a front tire. A space may be provided between the pillar reinforcement and the pillar front plate.

11 Claims, 5 Drawing Sheets

VEHICLE BODY

CROSS-REFERENCE TO RELATED APPLICATION

This application claims priority to Japanese Patent Application No. 2020-149248 filed on Sep. 4, 2020, the contents of which are hereby incorporated by reference into the present application.

TECHNICAL FIELD

The technique disclosed herein relates to a vehicle body. Especially, the disclosure herein provides a technique for effectively protecting a cabin upon an object colliding against a front portion of a vehicle.

BACKGROUND

When an object collides against a front portion of a vehicle, a front tire may be moved rearward relative to the vehicle body and may interfere with a front pillar. The front pillar may be deformed by the interference with the front tire. The cabin could be damaged if the deformation of the front pillar is significant.

Japanese Patent Application Publication Nos. 2016-22813 and 2015-136999 each describe a technique for reducing front pillar deformation caused by a collision with a front tire. In a vehicle body described in Japanese Patent Application Publication No. 2016-22813, a reinforcement, which is called a gusset, is arranged between a front pillar and a front tire. In a vehicle body described in Japanese Patent Application Publication No. 2015-136999, a reinforcement is arranged inside a front pillar. The reinforcement is positioned rearward of a front tire. The front pillar includes a pillar front plate, a pillar rear plate, a pillar outer plate, and a pillar inner plate, and these plates form a tube.

In Japanese Patent Application Publication No. 2015-136999, a bulkhead is arranged inside the front pillar as the reinforcement. The bulkhead includes two horizontal plates connecting the pillar front plate to the pillar rear plate and a vertical plate connecting the two horizontal plates to each other. The vertical plate is connected to the pillar front plate and the pillar rear plate as well as connects the two horizontal plates to each other. The bulkhead divides an inner space of the front pillar in an up-down direction.

SUMMARY

Using a gusset arranged between a front tire and a front pillar results in a weight increase. Although the reinforcement of Japanese Patent Application Publication No. 2015-136999 is simple and lightweight, the horizontal plates connecting the pillar front plate to the pillar rear plate transfer a collision load (load applied from the vehicle front) applied to the pillar front plate directly to the pillar rear plate. Applying a large load to the pillar front plate and the pillar rear plate at the same time may buckle and significantly deform the front pillar. As described, significant deformation of the front pillar could damage the cabin. The disclosure herein provides a technique that enables a cabin to be effectively protected upon an object colliding against a front portion of a vehicle.

A vehicle body disclosed herein may comprise a front pillar and a pillar reinforcement arranged in the front pillar. The front pillar may include a pillar front plate, a pillar rear plate, a pillar inner plate, and a pillar outer plate, and form a tube. The pillar reinforcement may be arranged rearward of a front tire. A space may be provided between the pillar reinforcement and the pillar front plate.

The pillar reinforcement reinforces a rear half of the front pillar. Since the space is provided between the pillar front plate and the pillar reinforcement, a front half of the front pillar may be squashed when the front tire interferes with the front pillar. The impact energy may be absorbed by the front half of the front pillar being squashed, as a result of which deformation of the rear half of the front pillar may be reduced. Deformation of the front pillar as a whole may be reduced by the front half of the front pillar absorbing the impact energy. The cabin may thereby be protected.

Details and further improvements of the technique disclosed herein will be described in DETAILED DESCRIPTION below.

DETAILED DESCRIPTION

Figure 1:
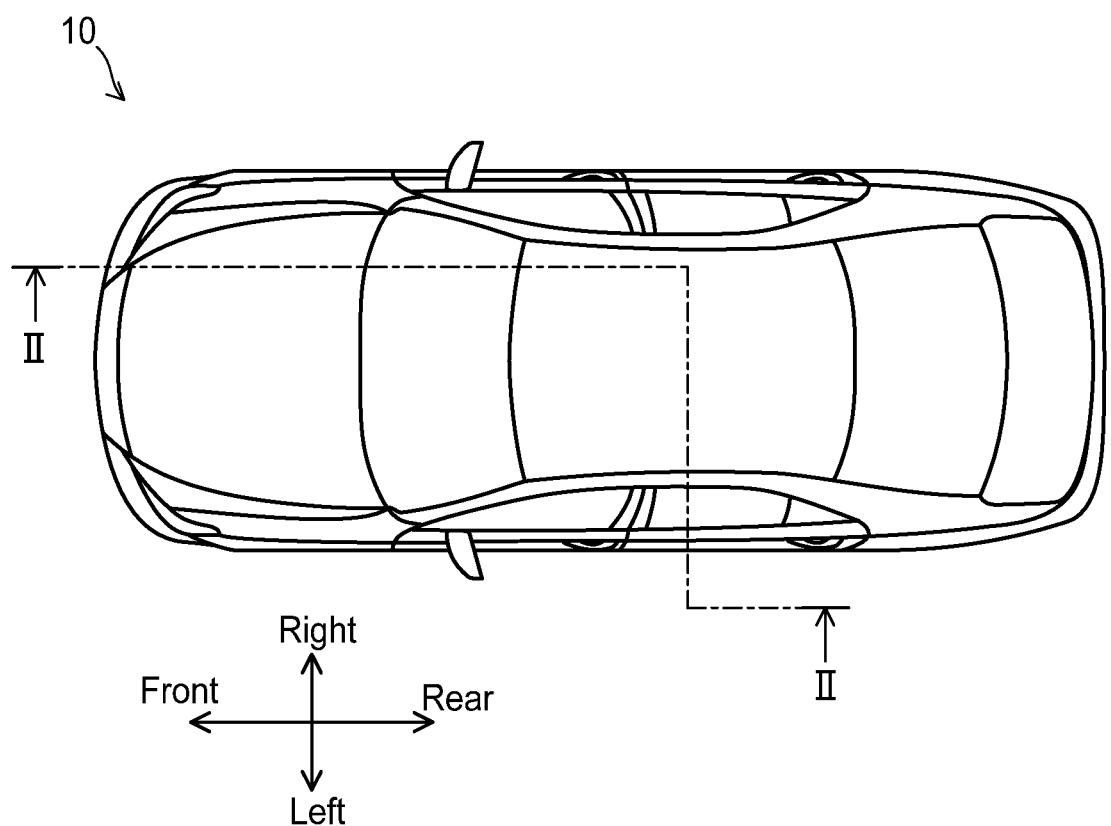
FIG. 1 is a plan view of a vehicle body of an embodiment.
Figure 2:
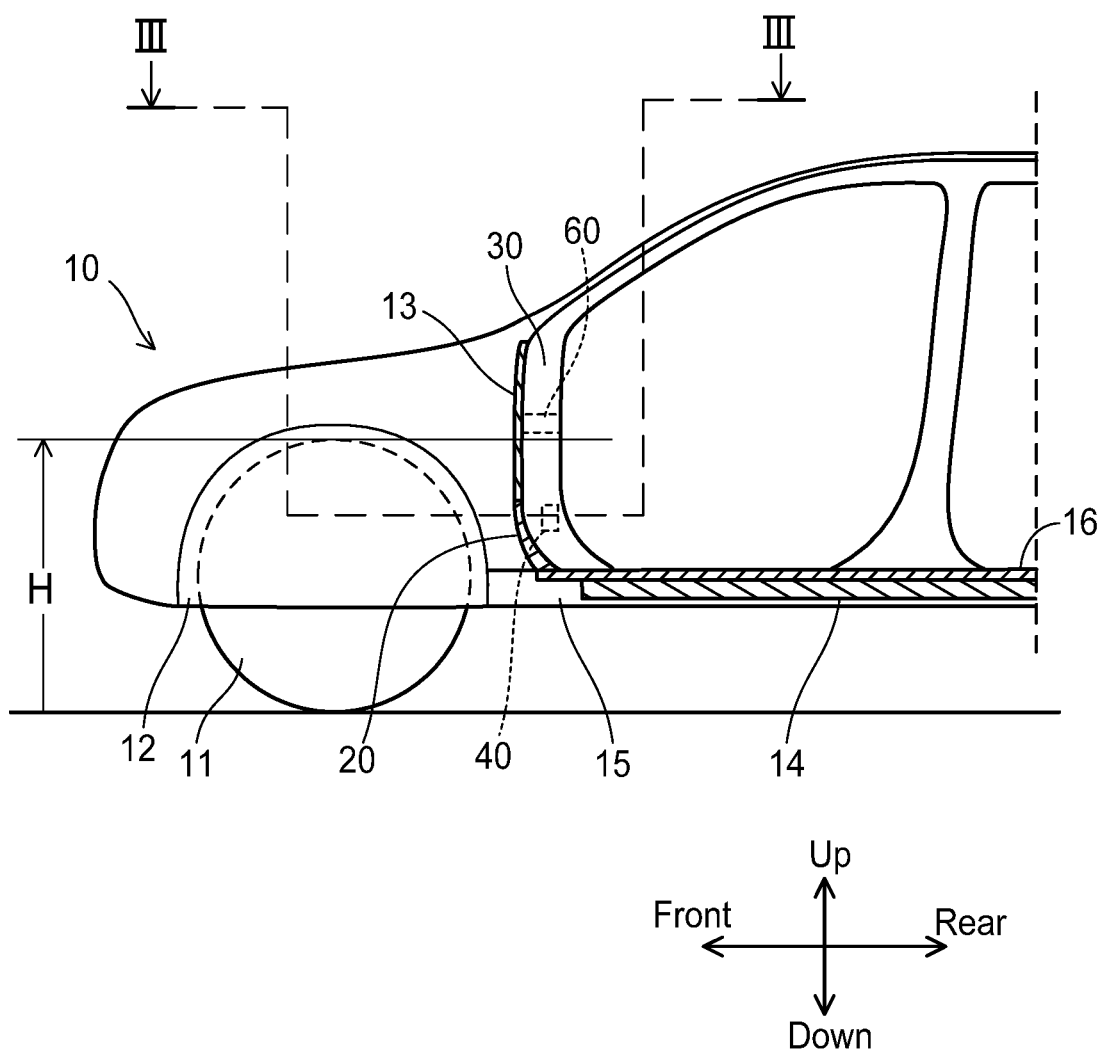
FIG. 2 is a cross-sectional view of the vehicle body along a line II-II in FIG. 1.

A vehicle body 10 according to an embodiment will be described referring to the drawings. FIG. 1 shows a plan view of the vehicle body 10. FIG. 2 shows a cross-sectional view of the vehicle body 10. The cross section shown in FIG. 2 is obtained by cutting the vehicle body 10 along a line II-II shown in FIG. 1. In FIG. 2, the cross section is schematically depicted and detailed structure of the vehicle body 10 is omitted. Further, devices housed in an engine compartment are not shown in the drawings. In FIG. 1, a dash crossmember reinforcement 22 (which will be described later) is not shown.

An upper half of a front tire 11 is hidden by a fender apron 12 and thus cannot be seen. A sign H represents a height from the ground to an upper end of the front tire 11. A pillar reinforcement 40 (which will be described in detail) is positioned rearward of the front tire 11, and a bulkhead 60 (which will be described in detail) is positioned above and rearward of the front tire 11.

The vehicle body 10 includes a dash panel 13, a dash crossmember 20, a front pillar 30, a rocker 15, and a floor panel 16. The front pillar 30 is a right front pillar of the vehicle body 10. The vehicle body 10 is a body of an electric vehicle, and a battery pack 14 is arranged below the floor panel 16.

The dash panel 13 is a partition plate separating the engine compartment (front compartment) from a cabin. The dash crossmember 20 is connected to a lower end of the dash panel 13, and a front edge of the floor panel 16 is connected to a lower end of the dash crossmember 20.

The front pillar 30 is connected to ends of the dash panel 13 and the dash crossmember 20 (their ends in a width direction of the vehicle body). A lower end of the front pillar 30 is connected to the rocker 15. The end of the dash crossmember 20 (the end in the width direction of the vehicle body) is also connected to the rocker 15. The front pillar 30, the dash crossmember 20, and the rocker 15 are connected to each other behind the front tire 11.

Although details will be described later, the front pillar 30 has a tubular shape, and the pillar reinforcement 40 and the bulkhead 60 are arranged inside the front pillar 30. The pillar reinforcement 40 is positioned rearward of the front tire 11. In other words, the pillar reinforcement 40 is arranged inside the front pillar 30 at a height level lower than the height H of the front tire 11. The bulkhead 60 is positioned above and rearward of the front tire 11. In other words, the bulkhead 60 is arranged at a height level higher than the height H of the front tire 11.

Figure 3:
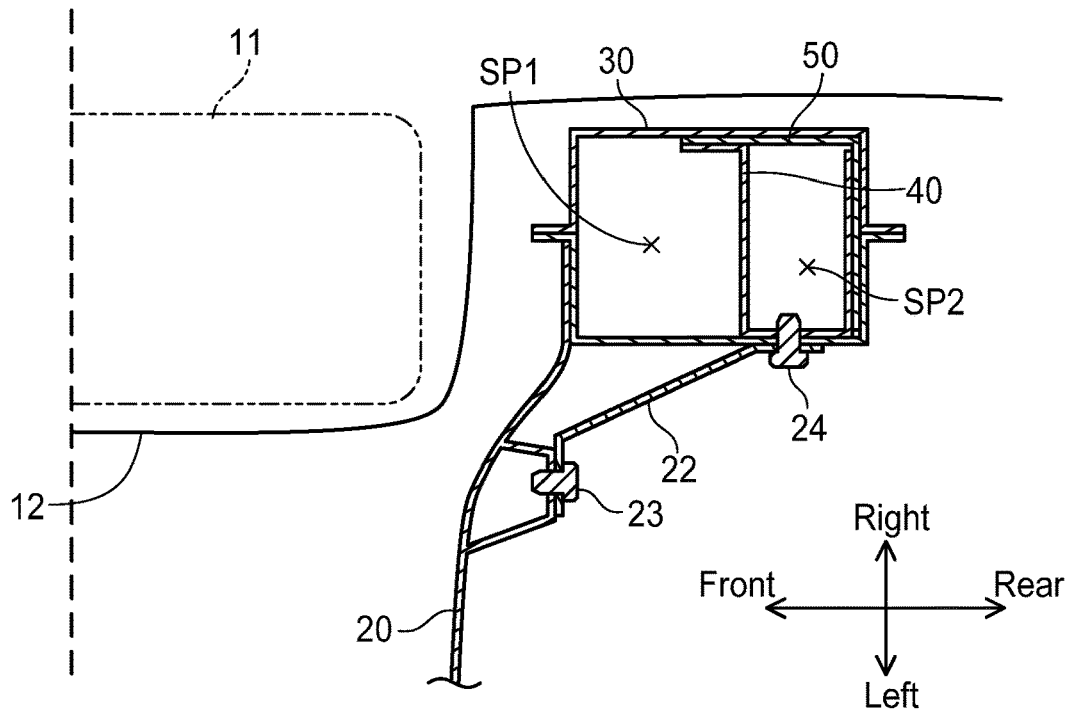
FIG. 3 is a cross-sectional view of the vehicle body along a line III-III in FIG. 2.
Figure 4:
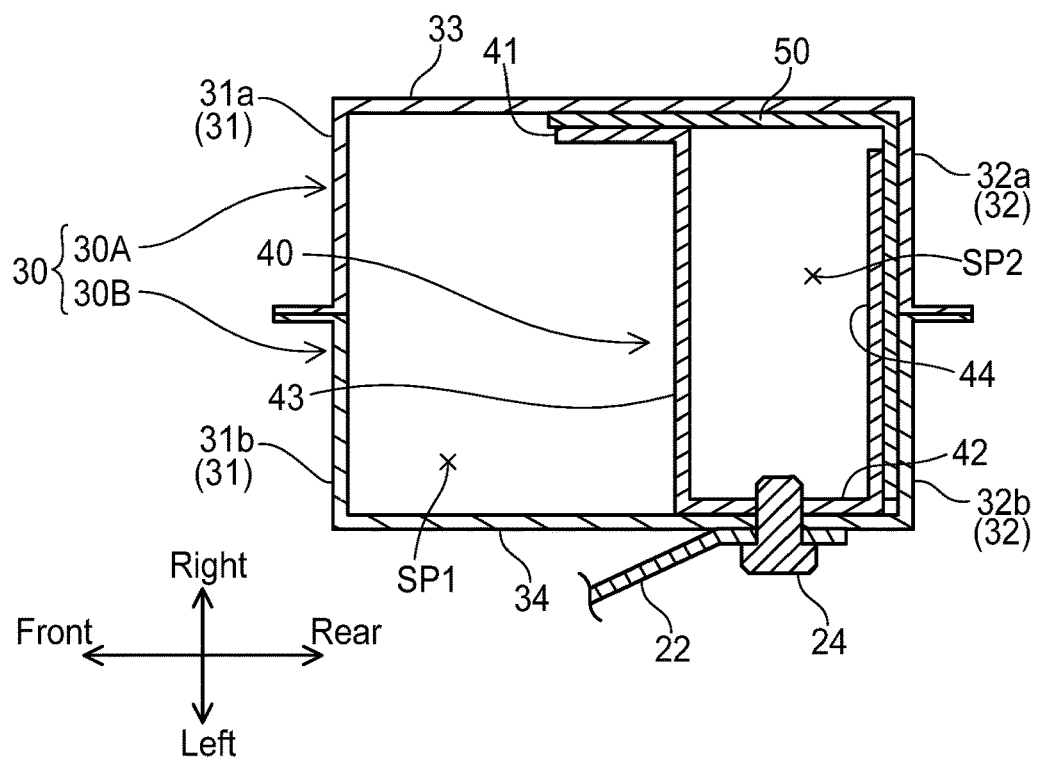
FIG. 4 is an enlarged cross-sectional view of a front pillar shown in FIG. 3.

FIG. 3 shows a cross-sectional view of the vehicle body 10 along a line III-III in FIG. 2. FIG. 4 shows an enlarged cross section of the front pillar 30 shown in FIG. 3. FIGS. 3 and 4 show cross sections of the front pillar 30 obtained by cutting it along a horizontal plane across the pillar reinforcement 40.

The front pillar 30 is configured of two panels, namely a pillar outer panel 30A and a pillar inner panel 30B. Each of the pillar outer panel 30A and the pillar inner panel 30B has flanges and surfaces of the flanges are joined to each other. Further, the front pillar 30 has a rectangular tube shape and includes a pillar front plate 31, a pillar rear plate 32, a pillar right plate 33, and a pillar left plate 34. The pillar right plate 33 is farther apart than the pillar left plate 34 from the center of the vehicle body 10 in the width direction.

The pillar front plate 31 is configured of a pillar-front-plate right half 31a of the pillar outer panel 30A and a pillar-front-plate left half 31b of the pillar inner panel 30B. Similarly, the pillar rear plate 32 is configured of a pillar-rear-plate right half 32a of the pillar outer panel 30A and a pillar-rear-plate left half 32b of the pillar inner panel 30B.

A lining plate 50 as well as the pillar reinforcement 40 is arranged inside the front pillar 30. The lining plate 50 is positioned rearward of the front tire 11 and lines a rear half of the pillar right plate 33 and the pillar rear plate 32. The pillar reinforcement 40 and the lining plate 50 reinforce the front pillar 30. Tensile strength of the lining plate 50 is higher than that of the front pillar 30. Hereinbelow, the structure of the pillar reinforcement 40 and its surroundings will be described.

The pillar reinforcement 40 includes a reinforcement right plate 41, a reinforcement left plate 42, a reinforcement middle plate 43, and a reinforcement rear plate 44. The reinforcement right plate 41 is farther apart than the reinforcement left plate 42 from the center of the vehicle body 10 in the width direction of the vehicle body 10. The reinforcement right plate 41 is welded to the lining plate 50, and the lining plate 50 is welded to the pillar right plate 33. The reinforcement left plate 42 is fixed to the pillar left plate 34 with a bolt 24. The reinforcement left plate 42 is fixed, with the bolt 24, to the pillar left plate 34 together with a dash crossmember reinforcement 22.

The reinforcement middle plate 43 connects the reinforcement right plate 41 to the reinforcement left plate 42. A plate surface (wider surface) of the reinforcement middle plate 43 is oriented in a front-rear direction of the vehicle body 10. Thus, a space SP1 is provided between the pillar reinforcement 40 (the reinforcement middle plate 43) and the pillar front plate 31. A space SP2 is provided between the pillar reinforcement 40 (the reinforcement middle plate 43) and the pillar rear plate 32.

The reinforcement rear plate 44 is positioned rearward of the reinforcement middle plate 43 and faces the reinforcement middle plate 43. The reinforcement rear plate 44 is joined to the pillar rear plate 32.

Figure 5:
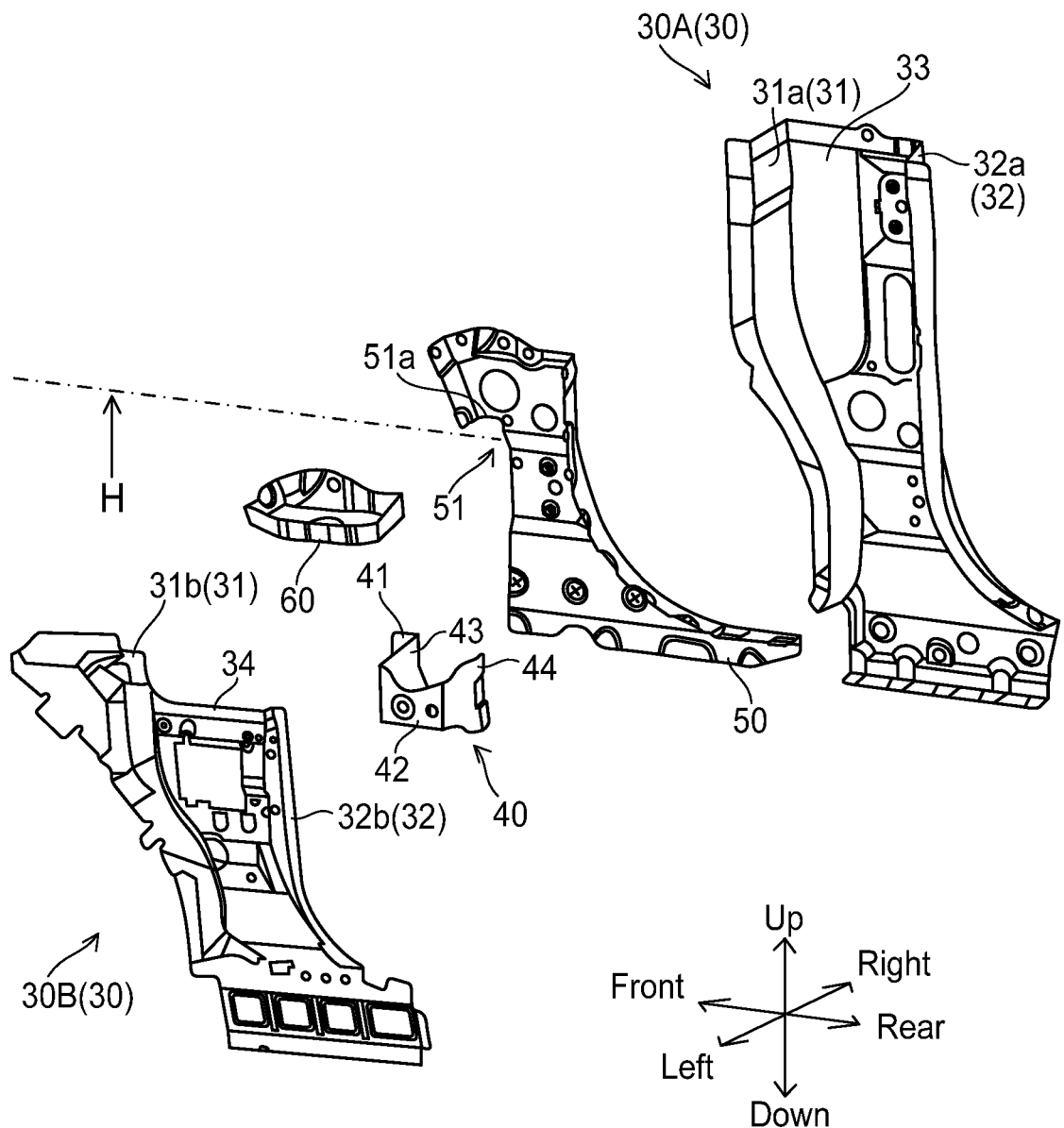
FIG. 5 is an exploded view of the front pillar.

FIG. 5 shows an exploded view of the front pillar 30. FIG. 5 depicts only a part of the front pillar 30 around the pillar reinforcement 40 and the bulkhead 60. In other words, FIG. 5 shows an exploded view of a lower portion of the front pillar 30.

As described, the front pillar 30 is configured of the pillar outer panel 30A and the pillar inner panel 30B, and in FIG. 5, these panels are disassembled. The pillar outer panel 30A corresponds to the pillar right plate 33, the pillar-front-plate right half 31a, and the pillar-rear-plate right half 32a shown in FIG. 4. The pillar inner panel 30B corresponds to the pillar left panel 34, the pillar-front-panel left half 31b, and the pillar-rear-plate left half 32b shown in FIG. 4.

The lining plate 50 is attached to an inner surface of the pillar outer panel 30A. A cutout 51 is provided in a front lower portion of the lining plate 50. FIG. 5 also shows the position of the lining plate 50 relative to the height H of the front tire 11, and an upper edge 51a of the cutout 51 in the lining plate 50 is positioned higher than the height H. Due to the cutout 51, the lining plate 50 lines only the rear half of the pillar right plate 33 behind the front tire 11.

The pillar reinforcement 40 is arranged inside the front pillar 30 at a height level lower than the height H. The bulkhead 60 is arranged inside the front pillar 30 at a height level higher than the height H. The bulkhead 60 is arranged inside the front pillar 30 such that it is in contact with all of the pillar front plate 31, the pillar rear plate 32, the pillar right plate 33, and the pillar left plate 34.

As described, the pillar reinforcement 40 is arranged inside the front pillar 30 and rearward of the front tire 11. When an object collides against a front portion of the vehicle body 10, the front tire 11 may be moved rearward. If the front tire 11 collides with the front pillar 30, the front pillar 30 may be deformed. If the deformation of the front pillar 30 is significant, the cabin may thereby be damaged. As will be described, the structure disclosed herein allows the front pillar 30 to absorb a collision impact and thus can protect the cabin.

The pillar reinforcement 40 reinforces the front pillar 30. The space SP1 is provided between the pillar front plate 31 and the pillar reinforcement 40. When the front tire 11 interferes with the front pillar 30, a front half of the front pillar 30 is squashed. The impact energy is absorbed by the front half of the front pillar 30 being squashed, and thereby reducing deformation of a rear half of the front pillar 30. Since the impact energy is absorbed by the front half of the front pillar 30 being squashed and the rear half of the front pillar 30 is reinforced by the pillar reinforcement 40, deformation of the front pillar 30 as a whole can be reduced. Thus, the deformation of the front pillar 30 does not affect the cabin much. Impact transmitted to the cabin can be also reduced by the front half of the front pillar 30 absorbing the impact energy.

The lining plate 50 also reinforces the front pillar 30. Since the lining plate 50 has the cutout 51 in its front lower portion in an area lower than the height 11, the lining plate 50 reinforces the rear half of the front pillar 30, while it does not reinforce the front half of the front pillar 30. Thus, when the front tire 11 contacts the front pillar 30, the lining plate 50 does not inhibit the front half of the front pillar 30 from being squashed and reduces the deformation of the rear half of the front pillar 30. The lining plate 50 also contributes to the reduction in damage to the cabin.

In an area higher than the height H of the front tire 11, the bulkhead 60 and the lining plate 50 reinforce both the front half and the rear half of the front pillar 30.

A relationship between the front pillar 30, the pillar reinforcement 40, the dash crossmember 20, and the rocker 15 will be described. As shown in FIG. 3, the dash crossmember reinforcement 22 is connected to the front pillar 30 and the dash crossmember 20. The dash crossmember reinforcement 22 is fixed to the dash crossmember 20 with a bolt 23 and is fixed to the pillar left plate 34 of the front pillar 30 with the bolt 24. As shown in FIG. 4, the dash crossmember reinforcement 22 is tightened with the bolt 24 together with the pillar left plate 34 and the pillar reinforcement 40.

The dash crossmember 20 extends in the width direction. A right end of the dash crossmember 20 is connected to the front pillar 30 and a left end thereof is connected to a left front pillar (not shown).

Figure 6:
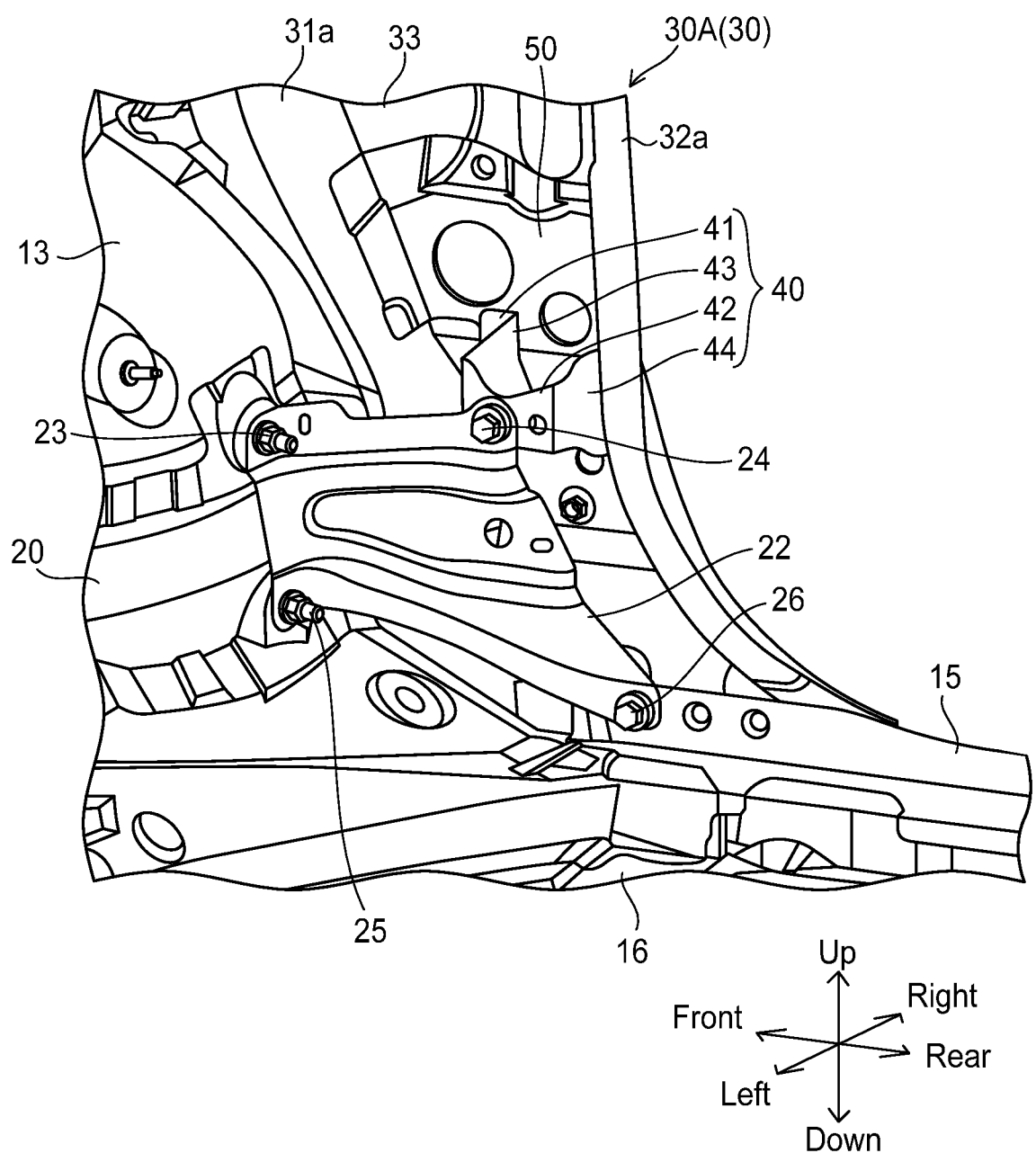
FIG. 6 is an enlarged oblique view of a dash crossmember reinforcement and its surroundings.

FIG. 6 shows an enlarged oblique view of the dash crossmember reinforcement 22 and its surroundings. In FIG. 6, depiction of the pillar inner panel 30B of the front pillar 30, that is, depiction of the pillar-front-plate left portion 31b, the pillar-rear-plate left portion 32b, and the pillar left plate 34 is omitted and the pillar reinforcement 40 arranged inside the front pillar 30 can be seen.

The dash crossmember 20 is connected to the lower end of the dash panel 13. The dash crossmember reinforcement 22 is connected to the dash crossmember 20 with bolts 23 and 25, and is also connected to the front pillar 30 and the pillar reinforcement 40 with the bolt 24. Although the pillar inner panel 30B is not depicted in FIG. 6 as described, the dash crossmember reinforcement 22 is connected to the pillar inner panel 30B (i.e., the front pillar 30), which is not shown, with the bolt 24.

Further, the dash crossmember reinforcement 22 is connected to the rocker 15 with a bolt 26. FIG. 6 corresponds to a structure behind the front tire 11 (not shown). That is, the dash crossmember reinforcement 22 is connected to the dash crossmember 20, the front pillar 30, and the rocker 15 behind the front tire 11. The floor panel 16 is connected to a lower end of the dash crossmember 20 and the rocker 15.

When an object collides against the front portion of the vehicle, a rearward force is applied to the dash crossmember 20 from the front. The dash crossmember reinforcement 22 disperses this force applied to the dash crossmember 20 to the front pillar 30 and the rocker 15. Since the dash crossmember reinforcement 22 is also connected to the pillar reinforcement 40, it transmits the force applied to the dash crossmember 20 to the robust portion of the front pillar 30. The dash crossmember reinforcement 22 reduces deformation of the dash crossmember 20 when an object collides against the front portion of the vehicle. That is, the cabin is protected. Further, the dash crossmember reinforcement 22 being connected to the pillar reinforcement 40 contributes to reduction in deformation of the front pillar 30 upon a collision.

Some of the features related to the technique described in the embodiment will be listed. A conventional reinforcement arranged inside the front pillar 30 divides the interior space of the front pillar 30 as the bulkhead 60 does. However, the pillar reinforcement 40 does not divide the interior space of the front pillar 30, and the space SP1 is provided between the pillar front plate 31 and the pillar reinforcement 40 (see FIGS. 3 and 4). This structure allows the front half of the front pillar 30 to be squashed and absorb the impact upon the collision. The deformation of the rear half of the front pillar 30 is thereby reduced, as a result of which the cabin is protected.

The vehicle body 10 according to the embodiment is the body of an electric vehicle, and the battery pack 14 is arranged below the floor panel 16 (see FIG. 2). The battery pack 14 is arranged rearward of the pillar reinforcement 40. This structure contributes to protection of the battery pack 14 when an object collides against the front portion of the vehicle body 10.

The front pillar 30 according to the embodiment is the right front pillar of the vehicle body 10. The pillar right plate 33 is farther apart than the pillar left plate 34 from a center line of the vehicle body 10. The pillar right plate 33 is an example of the pillar outer plate, and the pillar left plate 34 is an example of the pillar inner plate. The reinforcement right plate 41 is an example of the reinforcement outer plate, and the reinforcement left plate 42 is an example of the reinforcement inner plate. The reinforcement right plate 41 of the pillar reinforcement 40 is fixed to the lining plate 50, and the lining plate 50 is fixed to the pillar right plate 33 (the pillar inner plate). The reinforcement right plate 41 of the pillar reinforcement 40, the lining plate 50, and the pillar right plate 33 (the pillar inner plate) overlap each other.

The left front pillar of the vehicle body 10 may also include the pillar reinforcement 40, the bulkhead 60, the lining plate 50, and the dash crossmember reinforcement 22. In the left front pillar, the pillar left plate is farther apart than the pillar right plate from the center line of the vehicle body 10. The pillar left plate is an example of the pillar outer plate, and the pillar right plate is an example of the pillar inner plate. The reinforcement left plate fixed to the pillar left plate (the pillar outer plate) is an example of the reinforcement outer plate, and the reinforcement right plate fixed to the pillar right plate (the pillar inner plate) is an example of the reinforcement inner plate.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A vehicle body comprising:
    a front pillar including a pillar front plate, a pillar rear plate, a pillar inner plate and a pillar outer plate, wherein the pillar front plate, the pillar rear plate, the pillar inner plate and the pillar outer plate form a tube; and
    a pillar reinforcement arranged in the front pillar, wherein:
      the pillar reinforcement is arranged rearward of a front tire,
      a space is provided between the pillar reinforcement and the pillar front plate,
      the pillar reinforcement comprises:
        a reinforcement outer plate fixed to the pillar outer plate;
        a reinforcement inner plate fixed to the pillar inner plate; and
        a reinforcement middle plate connecting the reinforcement outer plate and the reinforcement inner plate to each other, wherein a plate surface of the reinforcement middle plate faces a forward direction of the vehicle body, and the space is provided between the reinforcement middle plate and the pillar front plate.

2. The vehicle body of claim 1, wherein the pillar reinforcement further comprises a reinforcement rear plate arranged rearward of the reinforcement middle plate and facing the reinforcement middle plate.

3. The vehicle body of claim 1, further comprising a lining plate lining the pillar rear plate and a rear half of the pillar outer plate, the lining plate being arranged rearward of the front tire,
   wherein the pillar reinforcement is fixed to the lining plate.

4. The vehicle body of claim 1, further comprising:
   a dash crossmember connected to the front pillar and a lower end of a dash panel, the dash crossmember extending along a width direction of the vehicle body; and
   a dash crossmember reinforcement connecting the dash crossmember and the pillar reinforcement to each other.

5. The vehicle body of claim 4, wherein the dash crossmember reinforcement is connected to a rocker.

6. The vehicle body of claim 1, further comprising a battery pack arranged under a floor panel,
   wherein the battery pack is positioned rearward of the pillar reinforcement in a front-rear direction of the vehicle body.

7. A vehicle body comprising:
   a front pillar including a pillar front plate, a pillar rear plate, a pillar inner plate and a pillar outer plate, wherein the pillar front plate, the pillar rear plate, the pillar inner plate and the pillar outer plate form a tube;
   a pillar reinforcement arranged in the front pillar, wherein:
     the pillar reinforcement is arranged rearward of a front tire,
     a space is provided between the pillar reinforcement and the pillar front plate; and
   a lining plate lining the pillar rear plate and a rear half of the pillar outer plate, the lining plate being arranged rearward of the front tire,
   wherein the pillar reinforcement is fixed to the lining plate.

8. The vehicle body of claim 7, wherein
   the pillar reinforcement comprises:
     a reinforcement outer plate fixed to the pillar outer plate;
     a reinforcement inner plate fixed to the pillar inner plate; and
     a reinforcement middle plate connecting the reinforcement outer plate and the reinforcement inner plate to each other, wherein a plate surface of the reinforcement middle plate faces a forward direction of the vehicle body,
   the space is provided between the reinforcement middle plate and the pillar front plate, and
   the pillar reinforcement further comprises a reinforcement rear plate arranged rearward of the reinforcement middle plate and facing the reinforcement middle plate.

9. The vehicle body of claim 7, further comprising:
   a dash crossmember connected to the front pillar and a lower end of a dash panel, the dash crossmember extending along a width direction of the vehicle body; and
   a dash crossmember reinforcement connecting the dash crossmember and the pillar reinforcement to each other.

10. The vehicle body of claim 9, wherein the dash crossmember reinforcement is connected to a rocker.

11. The vehicle body of claim 7, further comprising a battery pack arranged under a floor panel,
    wherein the battery pack is positioned rearward of the pillar reinforcement in a front-rear direction of the vehicle body.

\* \* \* \* \*